United States Patent [19]

Blakely

[11] Patent Number: 4,856,825
[45] Date of Patent: Aug. 15, 1989

[54] SWIVEL JOINT FOR ELECTRICAL CONDUIT

[75] Inventor: J. Ward Blakely, North Hollywood, Calif.

[73] Assignee: Ward Engineering, Inc., No. Hollywood, Calif.

[21] Appl. No.: 162,288

[22] Filed: Feb. 29, 1988

[51] Int. Cl.[4] ............................................. F16L 55/00
[52] U.S. Cl. .................................. 285/175; 285/184; 285/907; 174/86
[58] Field of Search ............... 285/181, 184, 185, 907, 285/273, 274, 175; 403/73, 113; 174/86

[56] References Cited

U.S. PATENT DOCUMENTS

| 169,342 | 11/1875 | Cushing | 285/184 X |
|---|---|---|---|
| 679,222 | 7/1901 | Filiatrault | 285/184 |
| 1,551,332 | 8/1925 | Schramm | 285/181 |
| 1,564,270 | 12/1925 | Phillips | 285/274 X |
| 2,825,586 | 3/1958 | Robboy | 285/181 |
| 4,008,910 | 2/1977 | Roche | 285/907 X |
| 4,700,017 | 10/1987 | Morond | 285/907 X |

Primary Examiner—Dave W. Arola
Attorney, Agent, or Firm—Harlan P. Huebner

[57] ABSTRACT

A swivel joint with electrical conduit guide means adapted to be mounted on a wall and having an opposed end to which an electrical fixture may be affixed. The joint includes a first and second half with mateable serrated teeth to lock one half to the other at an angle one to the other. In addition, a conduit guide means is mounted within one of the halves and fully enclosed by the other half and at least one half has an interior bore tapered downward in diameter presenting its smallest cross-section to said guide means. The guide means also includes structure to allow bending of said conduit with the angling of one half to the other without damage to said conduit.

5 Claims, 2 Drawing Sheets

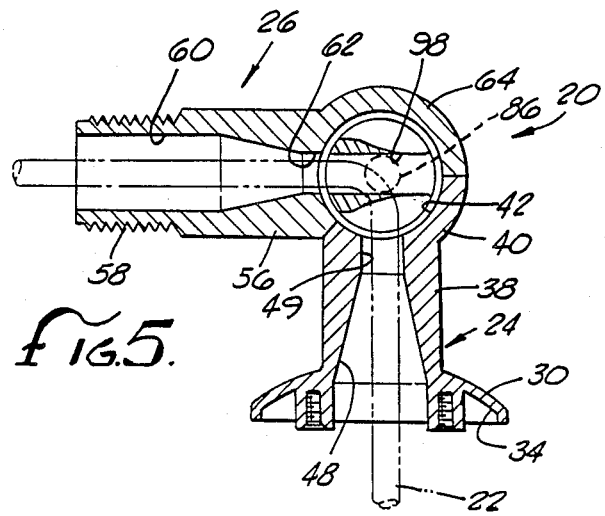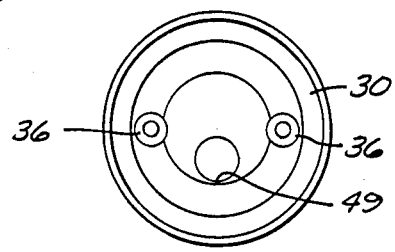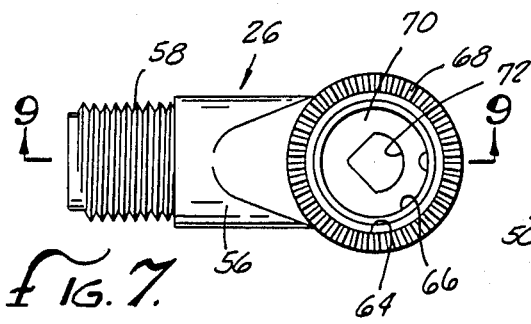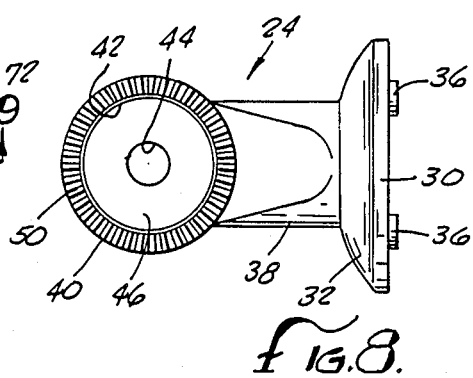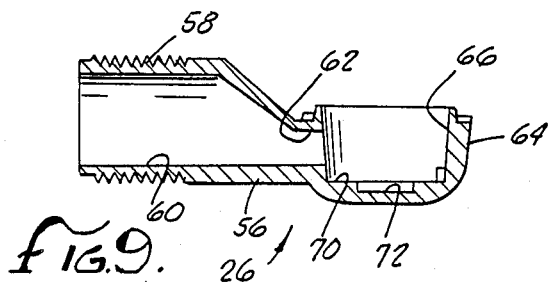

SWIVEL JOINT FOR ELECTRICAL CONDUIT

BACKGROUND OF THE INVENTION

1. Field of the Invention

This invention relates to a swivel joint for an electrical conduit and in particular to a swivel joint having conduit guide means for conduit insertion.

2. Description of the Prior Art

Heretofore swivel joints adapted to receive electrical cables or wires have been used. However, some of such swivel joints are constructed in such a way that the swivel cannot be turned to a severe angle without cutting the cable.

Further, prior art swivels have not included guide channels to facilitate insertion of conduit. Because the path for insertion has been circuitous considerable time and effort has been necessary for the insertion.

Applicant is aware of one such swivel joint illustrated in U.S. Pat. No. 2,825,586. In that particular swivel because there is no conduit guides it is usually necessary to separate the halves, thread through the cable and then reassemble the swivel. Such action is time consuming and cumbersome. In addition U.S. Pat. No. 2,825,586 provides in one half of the swivel an opening or bore through which a conduit will pass. It is obvious that if the swivel were turned at an extreme angle of 90°, one section to the other, the edge of the restricted opening would cut the conduit causing a short circuit.

SUMMARY OF THE INVENTION

It is a purpose of the present invention to provide a two piece swivel joint for electrical conduit that provides a conduit guide to thread cable or wires therethrough without the need to disassemble the pieces for insertion or threading.

Another object of the present invention is to provide a two piece swivel joint for electrical conduit where the conduit guide includes a tapered channel in one half of the swivel and a guide slide or ramp in the other half.

A still further object of the present invention is to provide a two piece swivel joint wherein the guide slide or ramp is of such a construction that the rotation of one half up to a 90° angle with respect to the other will not interfere with the conduit where the conduit becomes cut or the insulation becomes frayed or cut.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

These advantages may be more clearly understood from the following detailed description and by reference to the drawings in which:

FIG. 5 is view similar to FIG. 4 but with the swivel parts turned at an approximate 90° angle one part to the other;

FIG. 6 is an elevational end view of one portion or half of the electrical swivel of the present invention;

FIG. 7 is a top view of one half of the electrical swivel of the present invention;

FIG. 8 is a top view of the opposite half of the electrical swivel as shown in FIG. 7;

FIG. 9 is a cross sectional side elevational view of one half section of the electrical swivel taken on line 9—9 of FIG. 7;

DETAILED DESCRIPTION OF THE PREFERRED EMBODIMENT

Figure 1:
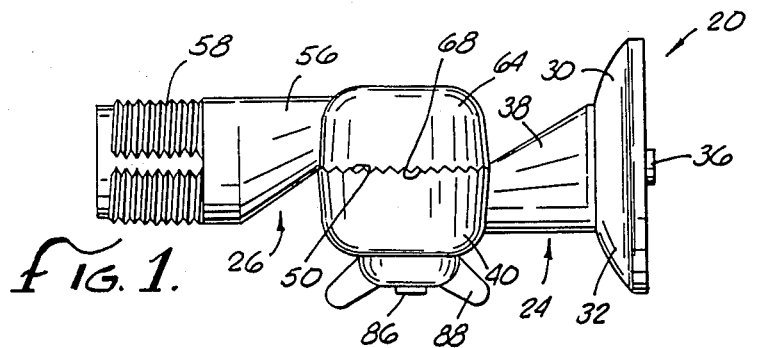
FIG. 1 is a side elevational view of the swivel joint forming the present invention.
Figure 2:
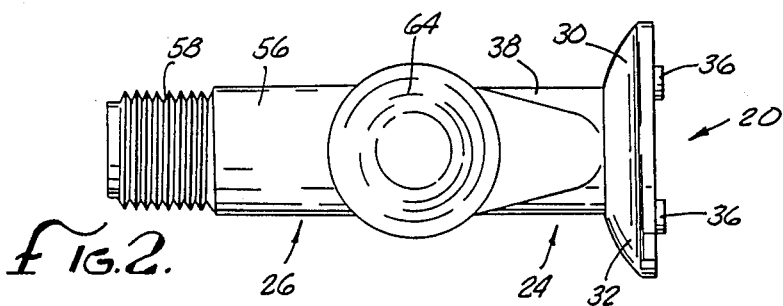
FIG. 2 is a top view of the swivel joint forming the present invention.

Referring to the drawings and particularly FIGS. 1 through 5 there is illustrated a swivel joint generally designated 20. The joint 20 is particularly adapted to form a wall fixture where electrical conduit 22 will pass through the swivel 20 to an electrical fixture (not illustrated) affixed to the swivel. It is to be recognized that the electrical conduit 22 may be duel wires or more in number, a cable or any appropriate conductors of electricity and ground element. In addition the swivel 20 is preferably constructed of an non-corrosive material such as brass or aluminum.

The swivel 20 includes two halves of housings in the form of a first half generally designated 24 and a second half generally designated 26. The first half 24 may also be referred to as a wall portion or wall housing that is secured to a structure such as a wall. The second half 26 may also be referred to a fixture portion or fixture housing in that it is adapted to receive a light fixture.

Mounted within the second half or fixture portion 26 of the swivel 20 is a conduit guide means generally designate 28, see FIGS. 10, 11, 12 and 13.

Turning now more particularly to the first half or wall portion 24 of the swivel 20, the portion 24 is preferably of a single piece construction including an end wall plate portion 30 that has a concave rear recess 34. Extending from the curved front face 32 rearwardly within the recess 34 are a pair of mounting legs 36 which are tapped and threaded to receive mounting screws. The end plate portion 30 is adapted to mount to a wall electrical receptacle or plate in a conventional manner.

Extending outwardly from the end plate portion 30 is a hollow extension arm 38 that terminates in a cup shaped conduit guide receiving portion 40. The cup shaped portion 40 has a cavity 42 and includes a bore 44 extending through a bottom wall 46.

Figure 3:
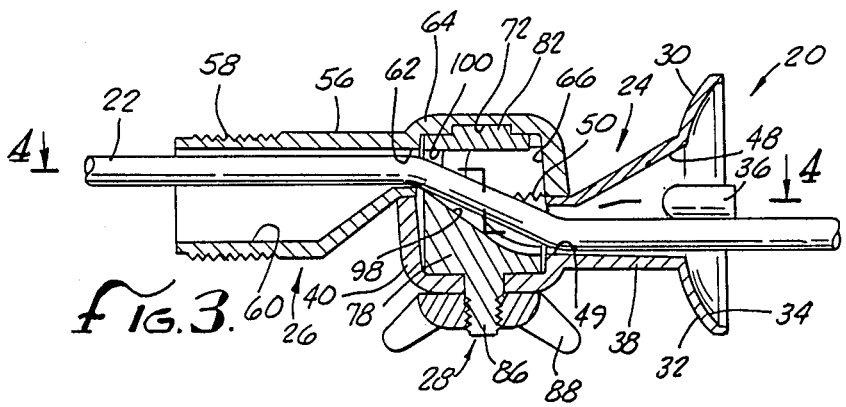
FIG. 3 is a side elevational sectional view of the swivel joint forming the present invention with an electrical conduit passing therethrough.
Figure 4:
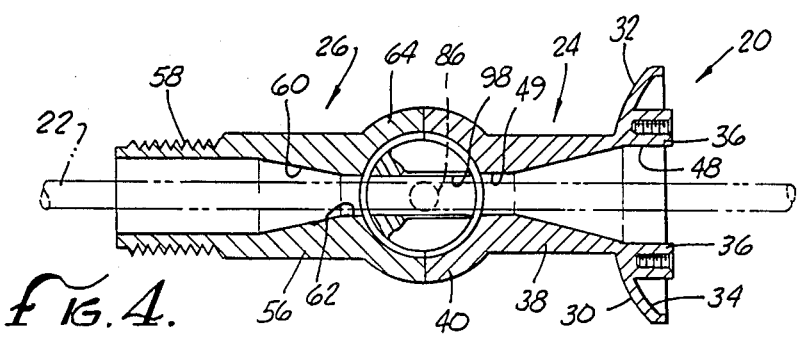
FIG. 4 is a top sectional view of the present invention taken on line 4—4 of FIG. 3.
Figure 13:
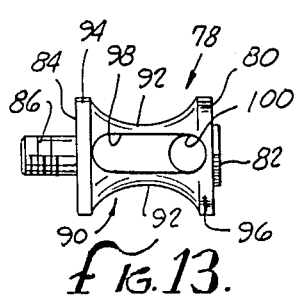
FIG. 13 is a front view of the guide means taken on line 13—13 of FIG. 10.
Figure 11:
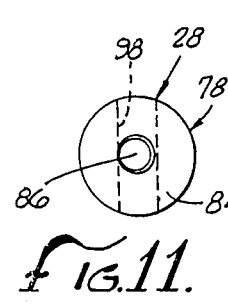
FIG. 11 is a view taken on line 11—11 of FIG. 10.
Figure 10:
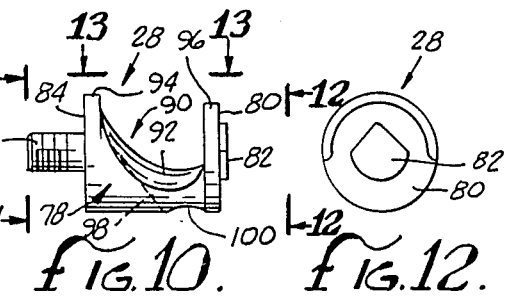
FIG. 10 is a side elevational view of the part of the conduit guide means employed in the electrical swivel of the present invention.
Figure 12:
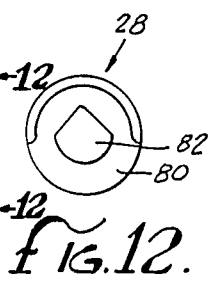
FIG. 12 is a view taken on line 12—12 of FIG. 10.

As can be seen in FIGS. 3, 4 and 5 the hollow extension arm 38 includes an elongated tapered bore 48 that extends through the end plate portion 30 and communicates with the cup portion 40 terminating in a reduced opening 49. The bore 48 is tapered from the end plate portion 30 to the cup portion 40. The purpose of the taper is to allow conduit to be threaded through the end plate portion 30 and channel it to the conduit guide means 28 in cavity 42 adjacent the bottom wall 46 of cup 40.

The cup 40 also includes a top annular serrated edge 50 for mating with a corresponding edge of the second half 26.

The second half or fixture portion 26 of the swivel 20 has an elongated tube section or extension arm 56 that includes an exterior threaded end 58 to receive a light fixture. The tube section 56 preferably includes an elongated bore 60 which again as with the other half is tapered and communicates at a reduced opening 62 with a cup portion 64 having a cavity 66. The tapered bore will allow an electrical conduit to be threaded from the fixture portion 26 through the conduit and out the bore 48 of the first half of swivel 20.

The cup portion 64 includes a top annular serrated edge 68 to mate with the edge 50 of the other half. The serrations will lock the halves of the swivel 20 at an angle one to the other such as seen in FIG. 5. In that Figure the fixture portion 26 is adjusted normal to the axis of the wall half 24 of the swivel 20.

Cut into the bottom wall 70, FIGS. 7 and 9 is a keying recess 72 which may be of any shape as long as it is not circular. The out of round recess 72 is adapted to key the conduit guide means 28 to be described.

The conduit guide means 28 is preferably made from non-corrosive metal such as aluminum and it is preferably milled or cast to be described and swedged or press fitted into the cavity 66 of the second half 26 of swivel 20. The means 28 includes an annular post 78 that has a base wall or bottom surface 80 with a keying projection 82 of the same shape as the keying recess 72. When the post 78 is inserted into the cavity 66 the keying projection 82 will interfit within the recess 72 and prevent the post from turning within the cavity.

At the top wall or top surface 84 of the post 78 a threaded shank 86 projects outward and when the second or fixture half 26 of the swivel is united with the first or wall half 24 the shank projects through bore 44 and a wing nut 88 or other form of nut is threaded onto the shank to lock the halves together.

In order to form the conduit guide and to prevent cutting of the insulation the conduit when the halves are angled one to the other, see FIG. 5, the intermediate portion 90 of the post 78 is formed and cut away.

As can best be seen in FIGS. 10 through 13, between the base wall 80 and top wall 84 the post in the intermediate portion 90 is cut away on the sides forming opposed concave walls 92. Extending from the outer edge 94 of top wall 84 axially diagonally downward and inwardly to the outer edge 96 of base wall 80 is an open conduit groove 98 which is concave and cut into the intermediate portion 90 post 78. At the bottom of the groove 98 a bore 100 is cut though the post 78 and of the same diameter as the reduced opening 62 of the elongated tube section 56 and is aligned therewith. The opposite end of the groove 98 will then be aligned with the reduced opening 49 of the first half 24 when the two halves are aligned on a common longitudinal axis such as seen in FIGS. 1 through 4.

With the first and second half 24 and 26 longitudinally aligned the electrical conduit may be pushed in from the back of the wall or end plate portion 30 through the reduced bore 48 which will guide the conduit to the reduced opening 49. As the groove 98 in effect becomes an extension of the reduced opening 49 continued pushing of the wire or conduit will cause it to move upward in the groove 98 until it reaches the top of the groove which is aligned with reduced opening 62. At that point continued pushing of the conduit will cause it to pass out the opening 62 into tapered elongated bore and out the second or fixture half 26.

Because of the concave walls 92 of the post 78 it can be seen that once a conduit 22 is threaded and in place there is sufficient void or space with the cavities 42 and 66 to allow the conduit to bend without cutting or maring the electrical insulation. Thus if the first or wall half 24 of the swivel 20 is secured in place the second or fixture half 26 may be rotated about an axis passing longitudinally through the threaded locking shank 86 up to 90° to the first half, see FIG. 5. Also because both sides of the post 78 are cut away the second half may be pivoted about the axis of the threaded shank 86 on either side of the first half 24.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A swivel joint when fully assembled particularly adapted for use with an electrical conduit wherein there is a first half and a second half each having a longitudinal axis and each half includes a cup portion at one end thereof, the cups each having an outer rim and the said cup rims are mateable one with the other forming an enclosure, said enclosure having a central axis passing therethrough normal to said longitudinal axis and means associated with said cups to retain the halves together and said halves are angularly adjustable about said central axis one to the other and the ends opposite said cups include securement means for mounting said joint to a structure and to an electrical fixture respectively, wherein said joint includes:

extension arms offset one from the other in one elevation extending between the cup and opposite end of each of said halves and each arm includes a bore offset one from the other in one direction that extends throughout the length of each of said arms along the respective longitudinal axes thereof communicating with the interior of the respective cup portions, at least one of said bores includes a reduced tapered guide diameter in the vicinity of said cup portion communicating therewith whereby the conduit may be threaded through said bore and guided to said enclosure formed by said cup portions; and conduit guide means mounted within said enclosure and secured in one of said cup portions, said conduit guide means includes a body portion having a wall and also having a channel to receive said conduit and said channel extends angularly diametrically across said cup between said offset bores whereby when said halves are secured together said groove extends angularly uninterruptly between said offset bores of said halves; wherein movement of one of said halves to a position up to normal to the other will not damage the conduit due to its bending when threaded therethrough.

2. A swivel joint as defined in claim 1 wherein said body portion is annular and has top and bottom flat surfaces, said bottom surface is seated on the bottom of one of said cup portions and the top flat surface is adapted to bear against the bottom of said other cup portion when the halves are mated together, and said channel extends diametrically diagonally from an approximate edge of one flat surface to an approximate edge of said other flat surface.

3. A swivel joint as defined in claim 2 wherein:

said bottom wall of said half in which said annular body is mounted includes an out of round recess; and a projection complimentary with the outline of said recess extends outwardly from the bottom flat surface of said annular body and is seated in said recess to prevent rotation of said annular body portion.

4. A swivel joint as defined in claim 2 wherein said annular body portion between said top and bottom flat surfaces is angularly cut inwardly from said annular wall and said channel is an open groove.

5. A swivel joint as defined in claim 4 wherein said annular body portion includes:

a diametrical outward angular cutout portion having an angled face extending between said top and bottom surfaces;

said channel is an open groove cut in said face that receives the electrical conduit; and a pair of side cut-away portions forming walls on either side of said groove providing void areas on either side of said groove whereby the angular adjustment about said central axis of one of said halves to the other will allow the conduit to move into one of said void areas and damage to the conduit is prevented.

* * * * *